(12) United States Patent
Freedman et al.

(10) Patent No.: US 8,583,903 B2
(45) Date of Patent: Nov. 12, 2013

(54) HELICAL BAND GEOMETRY FOR DYNAMICAL TOPOLOGY CHANGING

(75) Inventors: Michael Freedman, Redmond, WA (US); Parsa Bonderson, Santa Barbara, CA (US); Chetan Nayak, Santa Barbara, CA (US); Sankar Das Sarma, Potomac, MD (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 12/979,856

(22) Filed: Dec. 28, 2010

(65) Prior Publication Data

US 2011/0161638 A1   Jun. 30, 2011

Related U.S. Application Data

(60) Provisional application No. 61/290,661, filed on Dec. 29, 2009, provisional application No. 61/290,645, filed on Dec. 29, 2009.

(51) Int. Cl.
*H01L 29/78* (2006.01)

(52) U.S. Cl.
USPC .............................. 712/221; 365/129; 706/62

(58) Field of Classification Search
USPC .................. 712/221; 257/14; 365/129; 706/62
See application file for complete search history.

(56) References Cited

U.S. PATENT DOCUMENTS

| | | | |
|---|---|---|---|
| 7,277,872 B2* | 10/2007 | Raussendorf et al. | 706/14 |
| 7,321,131 B2* | 1/2008 | Freedman et al. | 257/9 |
| 7,394,092 B2* | 7/2008 | Freedman et al. | 257/14 |
| 7,518,138 B2* | 4/2009 | Freedman et al. | 257/9 |
| 8,058,638 B2* | 11/2011 | Freedman et al. | 257/9 |
| 2003/0055513 A1* | 3/2003 | Raussendorf et al. | 700/1 |
| 2008/0067496 A1* | 3/2008 | Freedman et al. | 257/12 |
| 2009/0079421 A1* | 3/2009 | Freedman et al. | 324/207.2 |
| 2010/0264910 A1* | 10/2010 | Bonderson | 324/207.2 |
| 2011/0161638 A1 | 6/2011 | Freedman et al. | |
| 2012/0028806 A1 | 2/2012 | Bonderson et al. | |
| 2012/0221268 A1 | 8/2012 | Freedman et al. | |
| 2012/0258861 A1* | 10/2012 | Bonderson et al. | 505/160 |

OTHER PUBLICATIONS

Zhou et al., "Methodology for quantum logic gate construction", Oct. 2000, Physical Review A., vol. 62, 052316, p. 1-12.*
Akhmerov et al., "Electrically Detected Interferometry of Majorana Fermions in a Topological Insulator", Physical Review Letters, The American Physical Society, May 28, 2009, 1-4.
Alicea, "Majorana Fermions in a Tunable Semiconductor Device", Dec. 10, 2009, 1-10.

(Continued)

*Primary Examiner* — Andrew Caldwell
*Assistant Examiner* — Yuqing Xiao
(74) *Attorney, Agent, or Firm* — Lyon & Harr, LLP; Richard T. Lyon (57) ABSTRACT

Disclosed herein are efficient geometries for dynamical topology changing (DTC), together with protocols to incorporate DTC into quantum computation. Given an Ising system, twisted depletion to implement a logical gate T, anyonic state teleportation into and out of the topology altering structure, and certain geometries of the (1,−2)-bands, a classical computer can be enabled to implement a quantum algorithm.

15 Claims, 9 Drawing Sheets

(56) References Cited

OTHER PUBLICATIONS

Bonderson et al., "Measurement-only Topological Quantum Computation via Anyonic Interferometry", Annals of Physics, Oct. 29, 2008, 787-826.

Freedman et al., "Tilted Interferometry Realizes Universal Quantum Computation in the Ising TQFT without Overpasses", Feb. 2, 2008, 1-23.

Freedman et al., "Towards Universal Topological Quantum Computation in the $v=5/2$ Fractional Quantum Hall State", Dec. 5, 2005, 1-23.

Fu et al., "Probing Neutral Majorana Fermion Edge Modes with Charge Transport", Physical Review Letters, The American Physical Society, May 28, 2009, 1-4.

Fu et al., "Superconducting Proximity Effect and Majorana Fermions at the Surface of a Topological Insulator", Physical Review Letters, The American Physical Society, Mar. 6, 2008, 1-4.

Sau et al., "A Generic New Platform for Topological Quantum Computation using Semiconductor Heterostructures", Jul. 17, 2009, 1-5.

Vincent, David Robert, U.S. Notice of Allowance, U.S. Appl. No. 12/979,778, Dec. 28, 2010, pp. 1-8.

\* cited by examiner

HELICAL BAND GEOMETRY FOR DYNAMICAL TOPOLOGY CHANGING

CROSS-REFERENCE TO RELATED APPLICATIONS

This application claims benefit under 35 U.S.C. §119(e) of provisional U.S. patent application No. 61/290,661, filed Dec. 29, 2009, and of provisional U.S. patent application No. 61/290,645, filed Dec. 29, 2009.

This application is related to U.S. patent application Ser. No. 12/979,778, entitled Method For Implementing The π/8 Gate In A Genus=1 Ising System], filed on even date herewith.

The entire disclosure of each of the foregoing applications is incorporated herein by reference.

TECHNICAL FIELD

The subject matter disclosed and claimed herein relates generally to the field of quantum computing. Specifically, the subject matter disclosed and claimed herein relates to helical band geometry for dynamical topology changing (DTC) and integration of DTC into a universal quantum computational protocol.

BACKGROUND

Figure 1A:
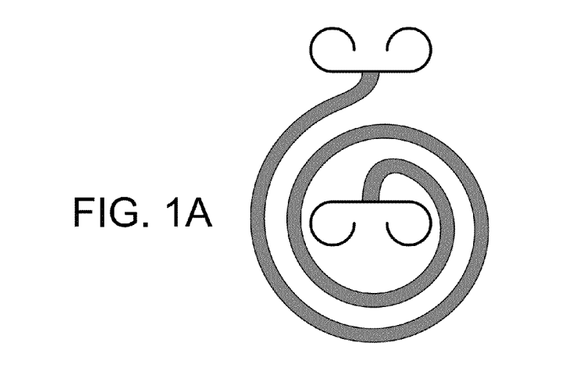
FIG. 1A depicts a non-planar sample of a material X consisting of a planar region together with an "over pass."
Figure 1B:
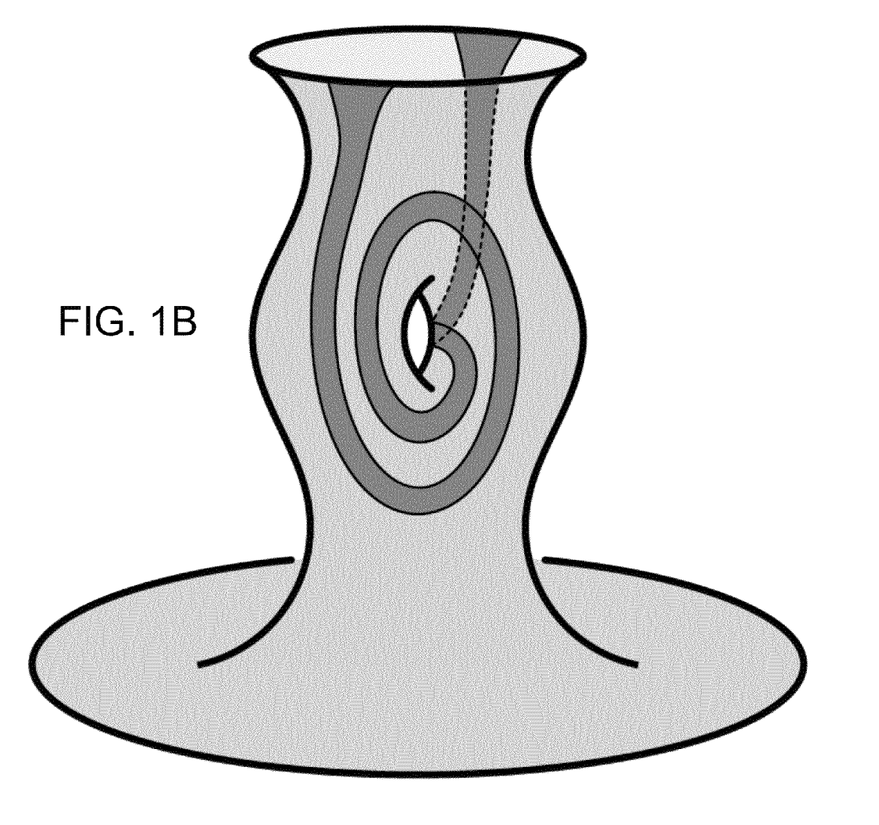
FIG. 1B shows the same topology as in FIG. 1A, but realized by a robustly three dimensional geometry.

Described in provisional U.S. patent application No. 61/290,645 and related U.S. patent application Ser. No. 12/979,778 are dynamically gatable structures called dynamical topology changing (DTC) devices which support an Ising state within arbitrary regions of a fixed curved surface Σ. A material "X" which supports, where appropriately gated, a pure Ising TQFT is detailed in the related applications. Possible local geometries for Σ are shown in FIGS. 1A and 1B hereof. FIGS. 1A and 1B each support a qubit.

It is known from the mathematical work of Bravyi and Kitaev as described in Freedman, Nayak, and Walker [arXiv:cond-mat/0512066], incorporated herein by reference, and Freedman, Nayak, and Walker [arXiv:cond-mat/0512072], incorporated herein by reference, that in the Ising state with (1) sufficiently general manipulations of topology, called smooth cobordism, together with (2) the ability to interferometrically measure topological charge along any simple closed curve on a surface in State X, a topologically protected universal gate set for quantum computing is achieved using Majorana fermions. The resulting computational logical gate set contains (and is generated by) the π/8-phase gate (T), the Hadamard gate (H), and the controlled-Z gate (CZ), represented by:

$$T = \begin{bmatrix} 1 & 0 \\ 0 & e^{i\pi/4} \end{bmatrix},$$

$$P = T^2 = \begin{bmatrix} 1 & 0 \\ 0 & i \end{bmatrix},$$

$$H = \frac{1}{\sqrt{2}} \begin{bmatrix} 1 & 1 \\ 1 & -1 \end{bmatrix},$$

$$CZ = \begin{bmatrix} 1 & 0 & 0 & 0 \\ 0 & 1 & 0 & 0 \\ 0 & 0 & 1 & 0 \\ 0 & 0 & 0 & -1 \end{bmatrix}$$

SUMMARY

Disclosed herein are efficient geometries for dynamical topology changing (DTC), together with protocols to incorporate DTC into quantum computation. Given an Ising system, twisted depletion to implement a logical gate T, anyonic state teleportation into and out of the topology altering structure, and certain geometries of the (1,−2)-bands, a classical computer can be enabled to implement a quantum algorithm.

Majorana pairs may be created and initialized in a qubit register. Majorana braiding and forced measurement can be implemented by physical gates to realize the "Clifford group" of logical gate operations. Twisted depletion may be utilized to achieve the gate T, making the entire computational package universal and topologically protected. Anyonic state teleportation may be employed to teleport quantum information into and out of the topology changing structure that is used to perform the twisted depletion which effects the gate T. After this, the twisted geometry may be returned to initial untwisted state, thus ensuring that there is no unmanageable build up of geometric twisting as the computation proceeds. The output of quantum computation may be rendered by a final set of qubit measurements in the topologically protected basis.

DETAILED DESCRIPTION OF ILLUSTRATIVE EMBODIMENTS

Described below are supporting technologies for manipulating topological charge in systems that support Ising-like topological features as well as a super conducting order parameter Δ. The DTC functions in a regime where Δ is suppressed but Ising topological properties are retained.

Creation and Initialization of Majorana Pairs

Following Fu and Kane [arXiv:0903.2427], incorporated by reference, pairs of Majorana states with trivial collective charge may be created using the superconducting proximity effects. Controlled Δ-phase jumps across superconducting islands can be arranged to produce a pair of ½-vortices with opposite chirality each populated by a Majorana quasiparticle.

Transportation/Braiding of Majoranas

Fu and Kane [PRL 100, 096407 (2008)], incorporated by reference, teach how to construct "Majorana wires" for transporting and braiding of Majoranas in the context of a 3D topological insulator (TI) with the superconducting proximity effect.

Measurement and Forced Measurement

Akhmerov, Nilsson, and Beenakker [PRL 102, 216404 (2009)], incorporated by reference, teach how to use superconducting and ferromagnetic insulator proximity effects to create Majorana interferometers which can measure topological charge. "Forced measurement" as described in patents of Bonderson, Freedman, and Nayak and [Annals Phys. 324, 787 (2009)], incorporated by reference, is then a consequence of "measurement" within this new Ising state context.

Anyonic State Teleportation

As described by Bonderson, Freedman, and Nayak [Annals Phys. 324, 787 (2009)], incorporated by reference, one can perform anyonic state teleportation either by using "forced measurement" or a combination of "measurement" and "braiding".

Qubit Encoding Change

As described and claimed in U.S. patent application Ser. No. 12/187,850, incorporated by reference, "forced measurement" of "measurement" and "braiding" may be used to change between different encodings of qubits, in particular, between 2 qubits in a 1 qubit in 4 anyons encoding (which is what will be used as the standard default encoding) and a 2 qubits in 6 anyons encoding, which are respectively represented in diagrammatic (modular tensor category (MTC)) notations by:

and

The curves above are world lines of quasi particles. The upper curves are "sigmas" while the lover curves carry any superposition of "trivial" and "psi."

Dynamical Topology Change

The topology of the Ising state within the DTC may be dynamically altered using a set of controllable gates. Depending on the precise semiconductor architecture housing the Ising state, we may employ gates using magnetic coils, or multiferroic materials, to remove certain regions of the two dimensional electron gas (2DEG) from the Ising state without actually depleting the electrons.

Twisted Depletion Gate T

The "twisted depletion" described below in greater detail, uses a specific application of dynamical topology change to enact the gate T upon a qubit partially encoded in a pair of boundaries in the topology changing structure. In particular, this is carried out by changing the topology, performing a measurement, and changing the topology again by depleting the electron gas of a twisted geometry.

Computational Logical Gates

In the standard qubit encoding (1 qubit in 4 anyons), the gates P and H can be obtained from braiding. It is worth distinguishing this implementation of P from the implementation of P that one would obtain by applying T2. This is because braiding is expected to be significantly easier to perform than the protocol (described below) used to implement T.

In the standard qubit encoding, the gate CZ can be obtained by the series of steps: i) switching from the standard encoding of 2 qubits to the 2 qubits in 6 anyons encoding, ii) performing braids, and iii) switching back to the standard encoding.

In the standard qubit encoding, the gate T can be obtained by the series of steps: i) perform an anyonic state teleportation of a qubit state partially encoded in a pair of Majorana quasiparticles to a pair of boundaries, each carrying Ising charge σ, which are part of the topology alteration structure, ii) apply the twisted depletion gate T to the qubit encoded in the pair of boundaries to transfer the quantum information from an ordinary Ising qubit to a "twisted Ising qubit," as shown in FIG. 2 below. iii) perform an anyonic teleportation of the state encoded in the twisted pair of boundaries, i.e., twisted qubit, to the initial pair of Majorana fermions, representing an ordinary Ising qubit.

Included in these building blocks are: 1) twisted depletion to implement logical gate T, which is described in detail on our related U.S. patent application Ser. No. 12/979,778; 2) anyonic state teleportation into and out of the topology altering structure, which is described in detail on our related U.S. patent application Ser. No. 12/979,778; and 3) geometry of (1,−2)-bands, which is described in detail herein. Given an Ising system and building blocks 1, 2, and 3 above, a classical computer may be adapted to implement a quantum algorithm. A classical computer is described in detail below.

Majorana pairs are created and initialized in the qubit register. Majorana braiding and forced measurement can be implemented by physical gates to realize the "Clifford group" of logical gate operations. Building block 1 is utilized to achieve the gate T, making the entire computational package universal and topologically protected. Building block 2 is employed to teleport quantum information into and out of the topology changing structure that is used to perform the twisted depletion which effects the gate T. After this, the twisted geometry may be returned to initial untwisted state, thus ensuring that there is no unmanageable build up of geometric twisting as the computation proceeds. The output of quantum computation is rendered by a final set of qubit measurements in the topologically protected basis (building block 4).

Each of these building blocks will now be described in detail.

Twisted Depletion to Implement the Gate T

According to the protocol in [arXiv:cond-mat/0512066 and arXiv:cond-mat/0512072], incorporated by reference, realizing the gate T requires a twofold Dehn twist, followed by a "straight" deletion of a band. Since Dehn twist is awkward (and perhaps impractical) to realize directly, we observe that it is topologically equivalent to deleting a doubly twisted band, we call it a "(1,−2)-band", from the Ising system—by application of depletion gates, or other gates, followed by a suitable teleportation protocol (see FIG. 3A). FIG. 1 shows the twisted band (shaded) in both geometries set forth in our related U.S. patent application Ser. No. 12/979,778.

FIG. 1A depicts a non-planar sample of a material X consisting of a planar region together with an "over pass." It is shown to be gated so that the entire region, except the heavy black band, is in the Ising state. FIG. 1B shows the same topology as in FIG. 1A, but realized by a robustly three dimensional geometry. Note that after deleting a twisted (1,−2)-band the standard 4σ qubit has one of its 2σ sides geometrically twisted.

Figure 2A:
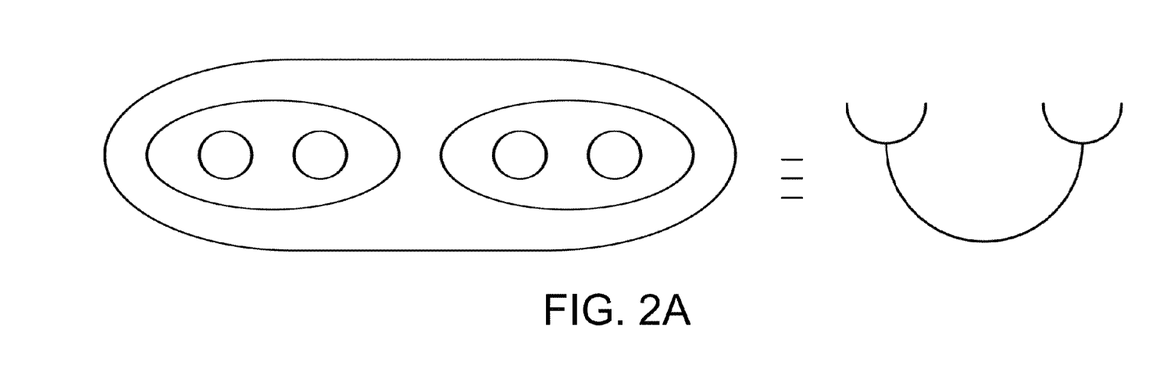
FIGS. 2A and 2B depict a qubit before and after twisting.
Figure 2B:
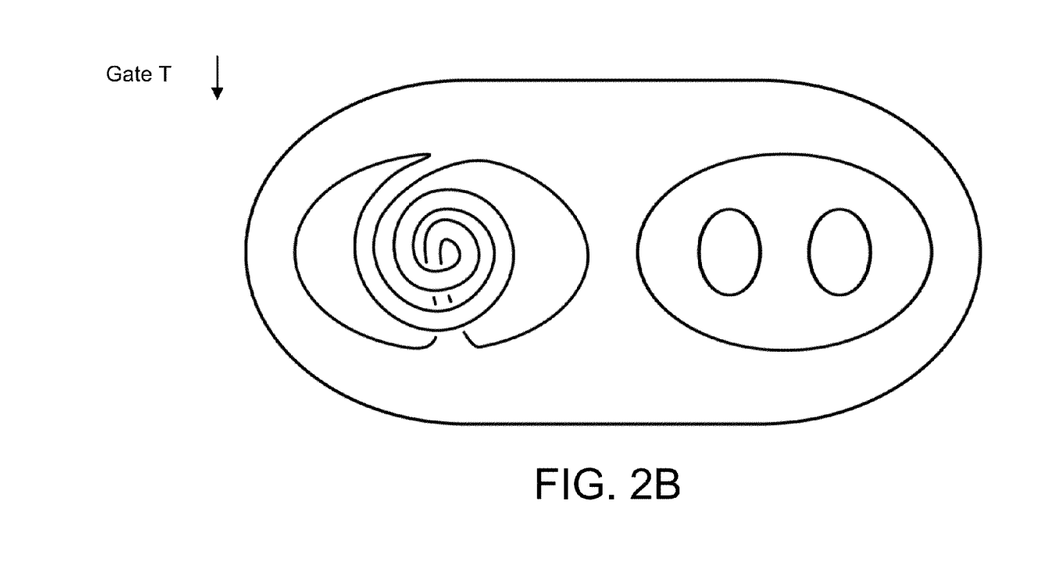

FIGS. 2A and 2B illustrate this, using the geometry of FIG. 1A. The gate T leaves an initial qubit geometrically twisted. FIG. 2A depicts a 4σ qubit, which is shown, at right, in MTC, anyon language for the initial qubit. FIG. 2B depicts the final qubit. A 4σ structure is used to hold a qubit. At left, an ordinary planar Ising structure is depicted. At the left side of FIG. 2B, a twisted Ising qubit obtained by removing a twisted band of Ising state within a DTC is depicted.

Anyonic State Teleportation into and Out of the Topology Altering Structure

Figure 3A:
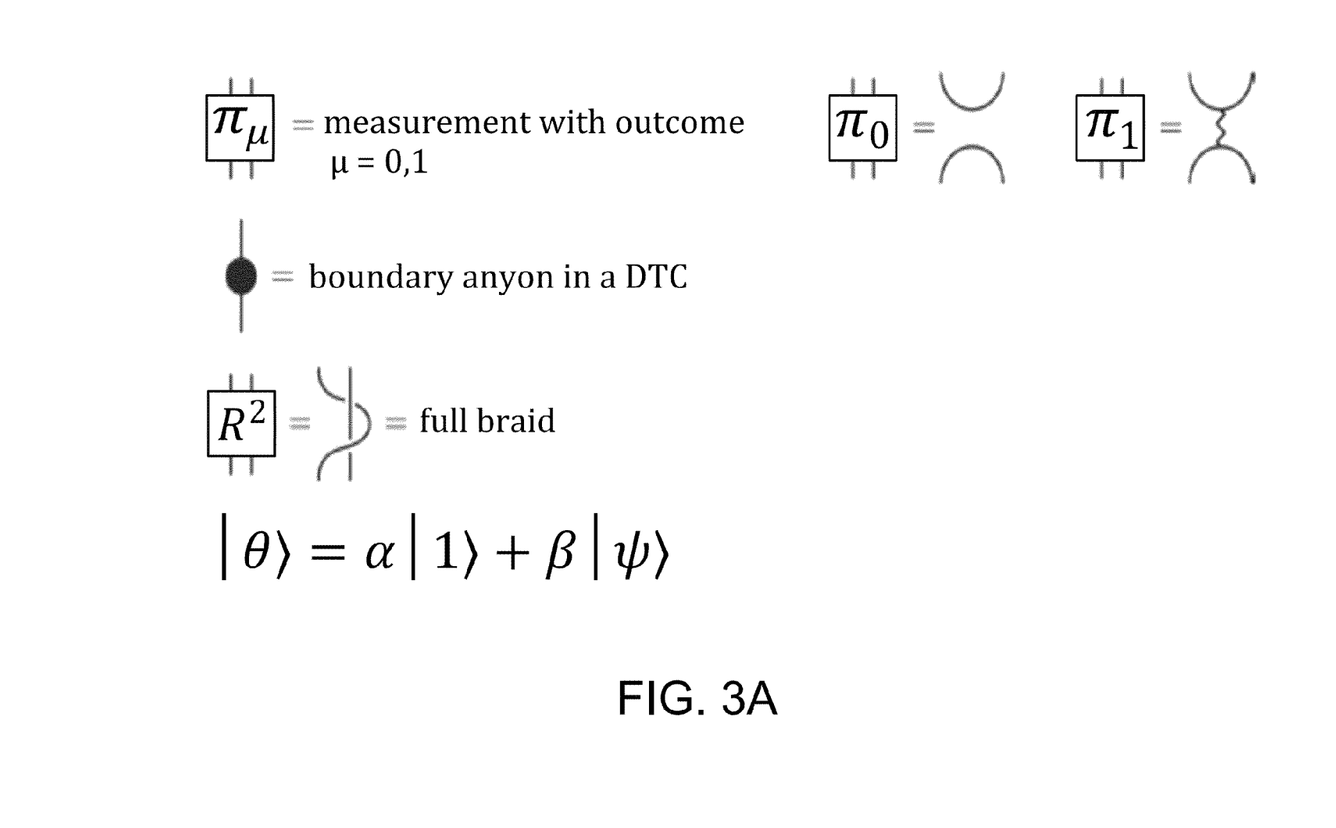
FIG. 3A provides a teleportation protocol.
Figure 3B:
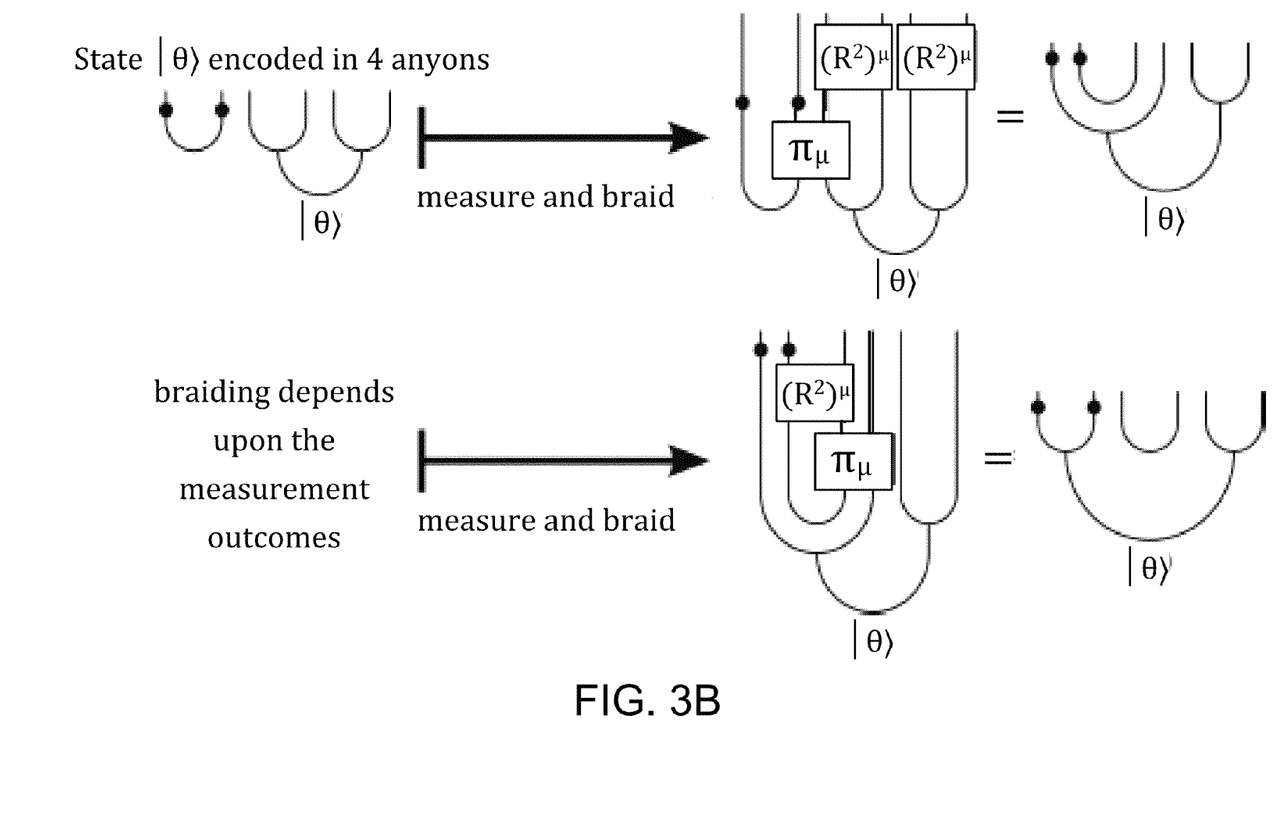
FIGS. 3B and 3C show anyonic teleportation of quantum information in and out of twisted qubits, respectively.
Figure 3C:
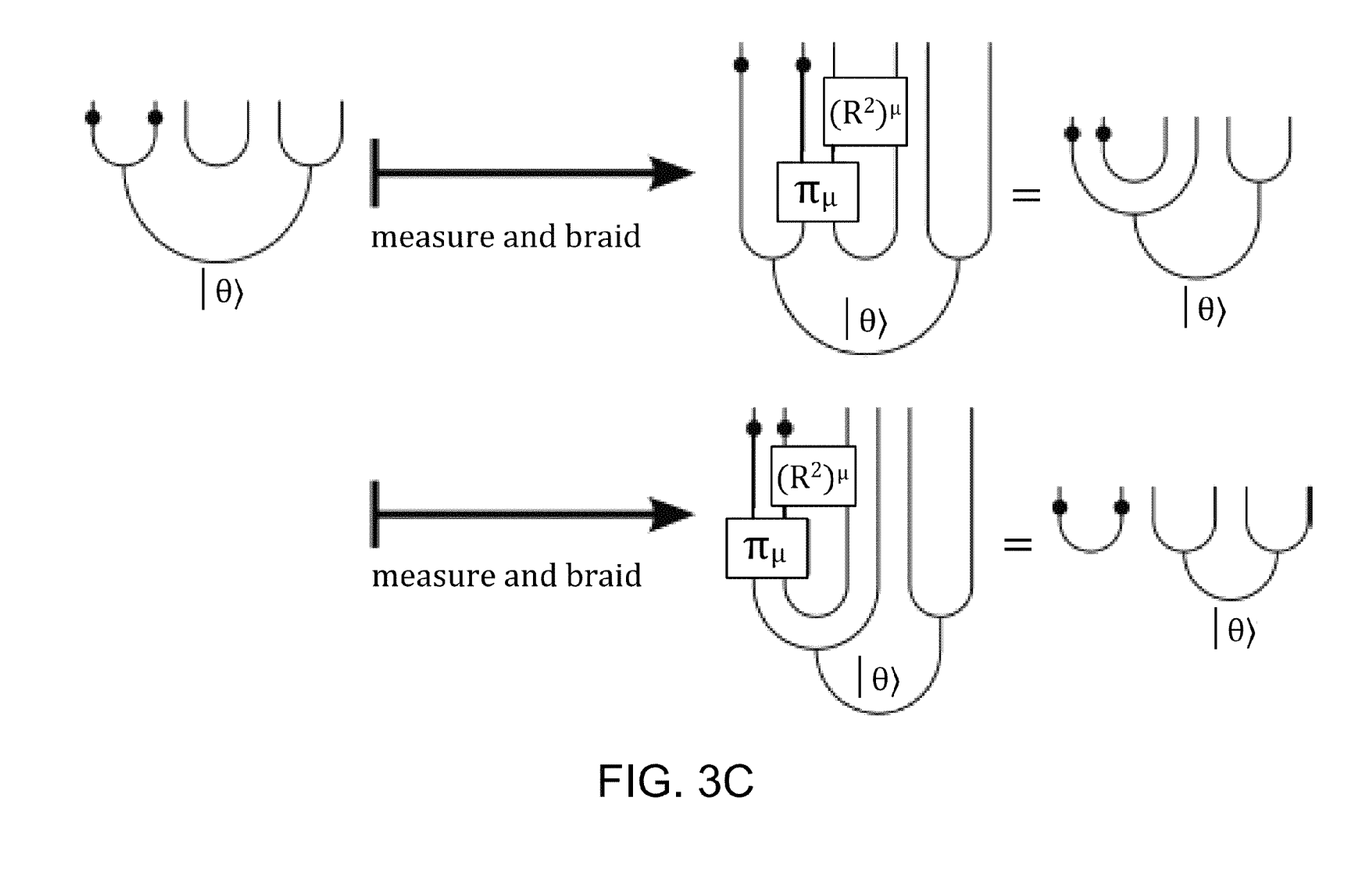

Through a combination of topological charge measurements and braiding, one can perform anyonic state teleportation so that a qubit goes from being partially encoded in a pair of Majorana quasiparticles to being partially encoded in a pair of boundaries, each of which carries an Ising charge σ. In particular, such boundaries may be part of a topology changing structure. Similarly, one can perform anyonic state teleportation so that a qubit goes from being partially encoded in a pair of such boundaries to being partially encoded in a pair of Majorana fermions. The teleportation protocol is shown in FIG. 3A, which provides a method for implementing the $\pi/8$ gate in a genus=1 Ising system. Anyonic teleportation of quantum information in and out of twisted qubits is shown in FIGS. 3B and 3C. FIG. 3B is the "into" protocol. FIG. 3C is the "out of" protocol.

Geometry of (1,−2) Bands

A teleportation protocol as disclosed herein may include Majorana interferometry along a twisted (1,−2)-band B lying on the surface Σ in the Ising state whose topology is that of a twice punctured torus. We show here the geometrically surprising fact that the band B, and hence the difficulty of accomplishing Majorana interferometry, can be simplified to where the band is a helix with a straight core. The totality of the surface Σ (which deforms with the band via the ambient isotopy theorem from differential topology) is a bit complicated when the band is a helix.

Figure 5:
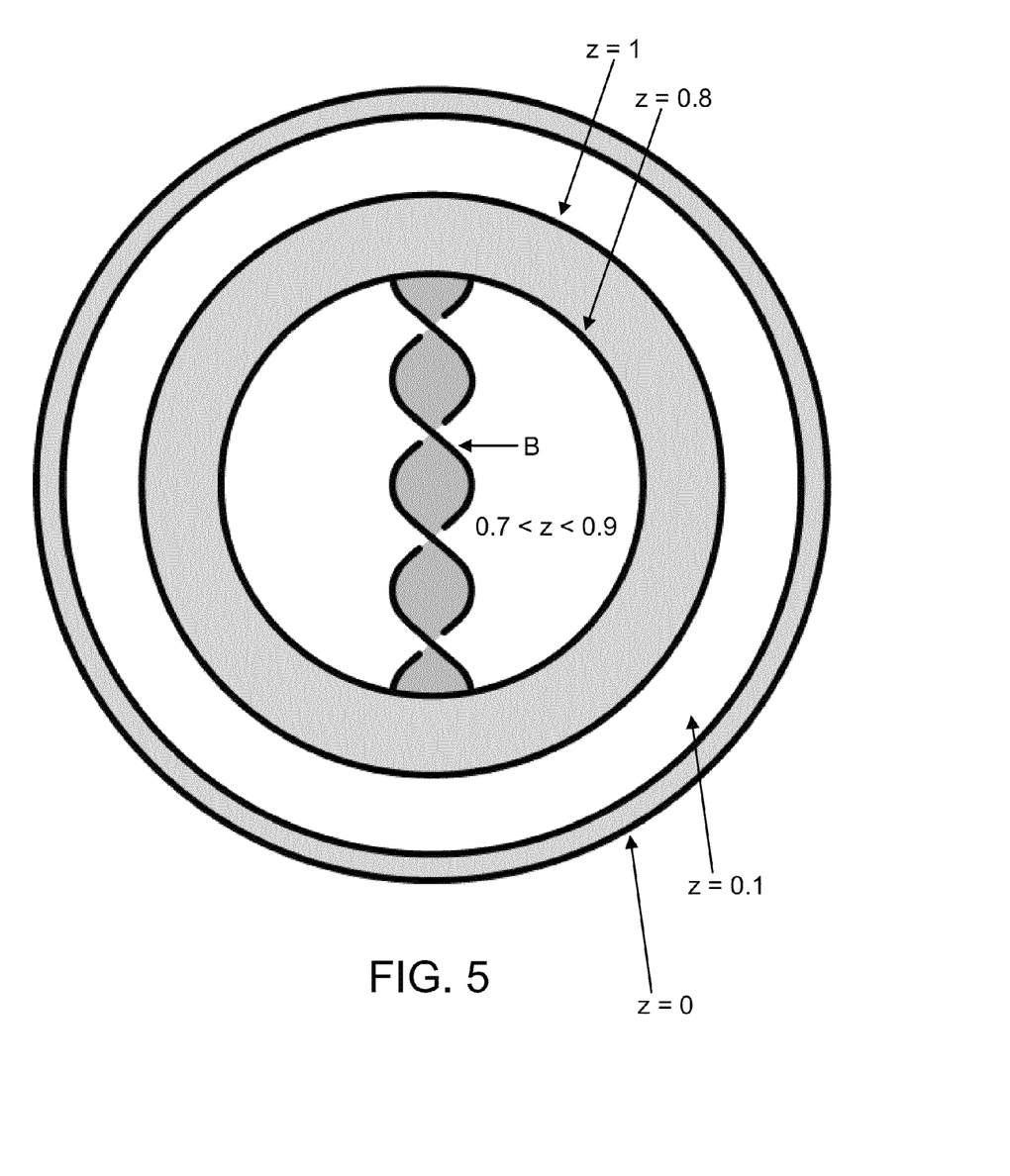
FIG. 5 shows the geometry for the DTC Σ contained in a spatial slab.

FIG. 5 is a top view of the geometry for the DTC Σ0 contained in a spatial slab S, with (1,−2)-band B heavily shaded seen in top view. The geometry for Σ is not fully rendered but will reside within the slab S. B is shown as a helix with straight core. Though it is possible to render the entire surface, FIG. 5 illustrates primarily the position of the band B.

Figure 6:
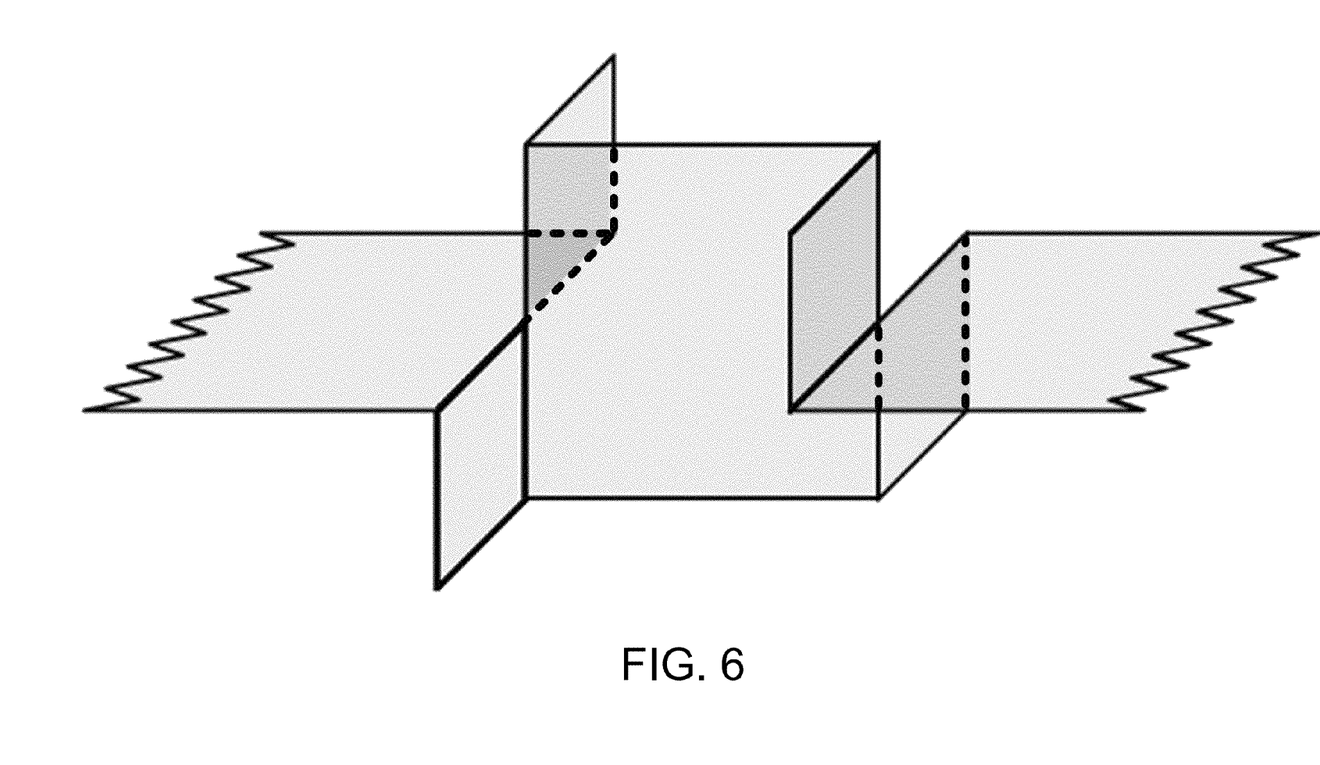
FIG. 6 is a close up of a twisted band, showing how it can be built in a cubulated architecture convient.

FIG. 6 is a possible combinatorial model for a straight-core helical band B in the context of cubulated geometry. Cubulation, or division into small cubes, models practical heterostructure architecture built through masking, deposition, lithography, and etching.

Figure 4A:
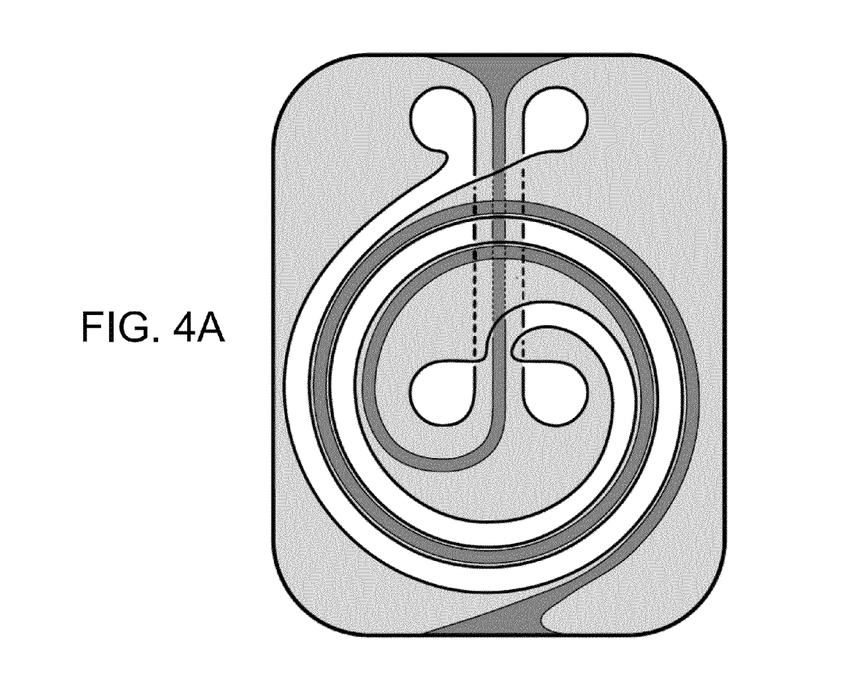
FIG. 4A depicts the geometry from FIG. 1B, with interferometry band B shown heavily shaded.
Figure 4B:
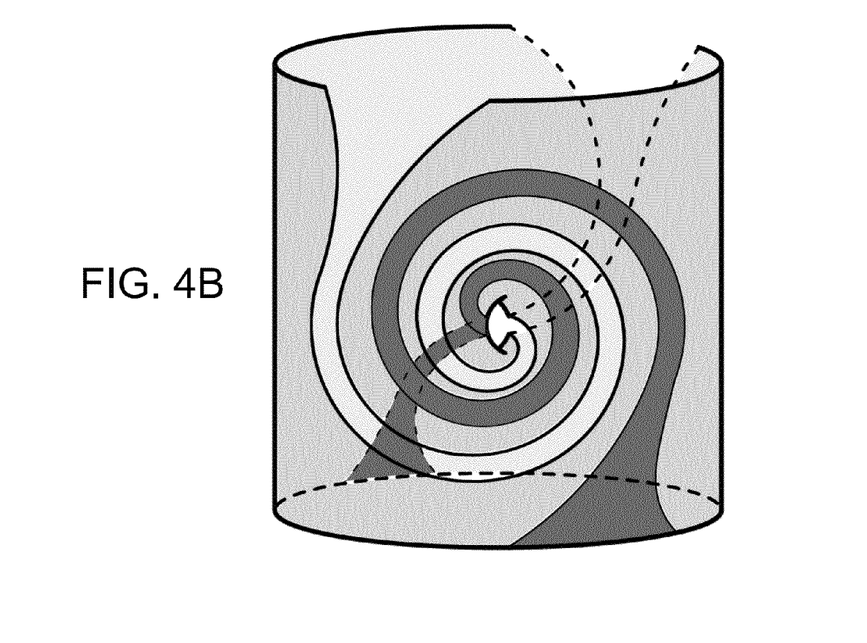
FIG. 4B depicts the geometry from FIG. 1A, with interferometry band B shown heavily shaded.

FIGS. 4A and 4B show how the twisted band B (shown in black), part of the interferometry loop of the "out of" protocol, will appear within the two DTC architectures shown in FIGS. 1A and 1B, respectively. In contrast, the twisted band shown in FIGS. 5 and 6 represents a more practical interferometry loop because of its shorter length. FIGS. 5 and 6 are included to illustrate the benefit of designing the DTC with B a helix with straight core.

The band B is topologically a (1,−2)-band because it twists twice around the longitude (φ-direction) while twisting once around the meridian (θ-direction). It may be written parametrically as $\{(\alpha, -2\alpha,)\}, \alpha \in [0, 2\pi]$, in (φ,θ)-coordinates. B is complementary to the deleted (1, −2) band, and parallel to it.

Building the DTC around an explicitly twisted band B, as shown, permits the shortest possible interferometer loop for the "out of" teleportation protocol.

Contour heights, z, are shown in FIG. 5. As shown, B lies between heights z=0.7 and z=0.9. The remainder of the surface Σ is not rendered.

FIG. 6 shows a close up of the twisted band of FIG. 5, showing how it can be built in a cubulated architecture convient, for example, to growth by molecular beam epitaxy (MBE). Our microscopic cubulated model for a ½ (i.e., $\pi$) helical twist with straight axis. Band B can be built by concatenating 4 such local models.

Example Computing Environment

Figure 7:
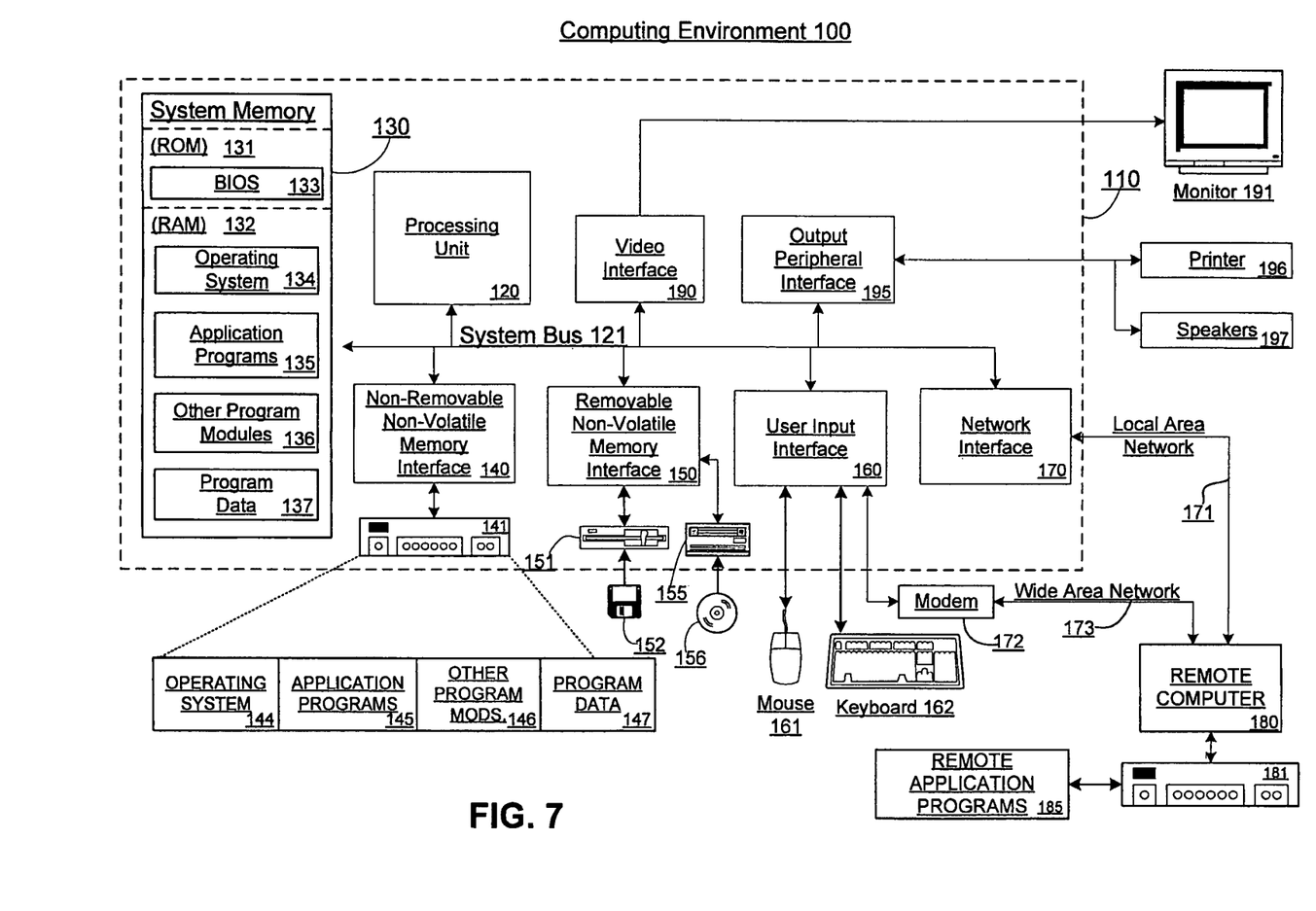
FIG. 7 depicts an example classical computing environment.

FIG. 7 shows an example computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

What is claimed:

1. A method for creating a dynamical topology changing (DTC) structure for use in quantum computing, the method comprising:
   creating and initializing a Majorana pair in a qubit register;
   implementing Majorana braiding and forced measurement by physical gates to realize a Clifford group of logical gate operations; and
   utilizing twisted depletion to achieve a gate T.

2. The method of claim 1, further comprising:
   employing anyonic state teleportation to teleport quantum information into and out of the DTC structure.

3. The method of claim 1, wherein the twisted depletion is performed by changing a topology, performing a measurement, and changing the topology again by depleting an electron gas of a twisted geometry.

4. The method of claim 3, further comprising:
   returning the twisted geometry to an initial untwisted state.

5. The method of claim 4, wherein returning the twisted geometry to the initial untwisted state ensures that there is no unmanageable build up of geometric twisting as the measurement proceeds.

6. The method of claim 1, further comprising:
rendering an output of quantum computation by a final set of qubit measurements in a topologically protected basis.

7. A method for obtaining a gate T in standard qubit encoding, the method comprising:
performing an anyonic state teleportation of a qubit state partially encoded in a pair of Majorana quasiparticles to a pair of boundaries, each of which carries an Ising charge σ and is part of a topology alterating structure;
applying a twisted depletion gate T to the qubit encoded in the pair of boundaries to transfer quantum information from an ordinary (sing qubit to a twisted Ising qubit; and
performing an anyonic teleportation of a state encoded in the twisted qubit to the initial pair of Majorana quasiparticles, representing an ordinary (sing qubit.

8. The method of claim 7, wherein performing the anyonic state teleportation comprises executing a protocol for anyonic teleportation into the topology altering structure.

9. The method of claim 7, wherein performing the anyonic state teleportation comprises executing a protocol for anyonic teleportation out of the topology altering structure.

10. The method of claim 7, wherein performing the anyonic state teleportation comprises executing a teleportation protocol that includes Majorana interferometry along a twisted (1,−2)-band lying on a surface in an Ising state whose topology is that of a twice punctured torus.

11. The method of claim 10, wherein the topology altering structure has a longitude and a meridian, and wherein the (1,−2)-band twists twice around the longitude and once around the meridian.

12. A dynamical topology changing (DTC) structure for use in quantum computing, comprising:
a Majorana pair in a qubit register configured using Majorana braiding and forced measurement by physical gates to realize a Clifford group of logical gate operations; and
a gate T formed using twisted depletion, which is capable of being removed from the DTC structure.

13. The DTC structure of claim 12, further comprising a twisted (1,−2)-band for use in anyonic state teleportation to teleport quantum information into and out of the DTC structure.

14. The DTC structure of claim 13, wherein the gate T formed using twisted depletion is formed by changing a topology, performing a measurement, and changing the topology again by depleting an electron gas of a twisted geometry.

15. The DTC structure of claim 14, wherein the gate T formed using twisted depletion, which is capable of being removed from the DTC structure, is removed by returning the twisted geometry to an initial untwisted state.

* * * * *